(12) United States Patent
Callan

(10) Patent No.: US 6,301,490 B1
(45) Date of Patent: Oct. 9, 2001

(54) AUDIO HEADSET COMMUNICATION APPARATUS AND METHOD

(76) Inventor: Edward William Callan, 4853 Ruette de Mer, San Diego, CA (US) 92130

( * ) Notice: Subject to any disclaimer, the term of this patent is extended or adjusted under 35 U.S.C. 154(b) by 0 days.

(21) Appl. No.: 09/097,209

(22) Filed: Jun. 12, 1998

(51) Int. Cl.$^7$ ........................................ H04B 1/38
(52) U.S. Cl. ................ 455/568; 455/575; 455/149; 379/430
(58) Field of Search ................ 455/66, 550, 575, 455/568, 149; 381/14, 3, 311, 123, 74, 79, 315; 379/430, 431, 432

(56) References Cited

U.S. PATENT DOCUMENTS

| | | | |
|---|---|---|---|
| 3,512,088 | * 3/1967 | Ross | 455/351 |
| 3,902,120 | * 8/1975 | Dascal et al. | 325/361 |
| 4,132,861 | * 1/1979 | Frieder, Jr. et al. | 179/115.5 |
| 4,347,405 | 8/1982 | Davis . | |
| 4,491,699 | * 1/1985 | Walker | 197/156 |
| 4,920,570 | 4/1990 | West et al. . | |
| 5,034,996 | * 7/1991 | Carey et al. | 455/345 |
| 5,233,663 | * 8/1993 | Wood | 381/80 |
| 5,404,577 | * 4/1995 | Zuckerman et al. | 455/66 |
| 5,448,637 | * 9/1995 | Yamaguchi et al. | 379/430 |
| 5,590,407 | * 12/1996 | Ishikawa et al. | 455/66 |
| 5,596,638 | * 1/1997 | Paterson et al. | 379/430 |
| 5,694,467 | * 12/1997 | Young, III | 379/430 |
| 5,754,960 | * 5/1998 | Downs et al. | 455/508 |
| 5,794,127 | * 8/1998 | Lansang | 455/66 |
| 5,867,768 | * 2/1999 | Onda | 455/66 |
| 5,978,689 | * 11/1999 | Tuoriniemi et al. | 455/569 |
| 6,006,115 | * 12/1999 | Wingate | 455/568 |

* cited by examiner

*Primary Examiner*—William Trost
*Assistant Examiner*—Tilahun Gesesse
(74) *Attorney, Agent, or Firm*—Edward W. Callan

(57) ABSTRACT

An audio communications system enables a person using an stereophonic audio headset to selectively communicate simultaneously with two or more persons. The system includes a headset having a first earphone for reproducing a first voice communication in response to a received first audio communication signal and a second earphone for reproducing a second voice communication in response to a received second audio communication signal. Control means located for use by a person wearing the headset selectively enable the first voice communication to be reproduced by the first earphone and/or the second voice communication to be reproduced by the second earphone. Attention signals associated with the respective earphones are received and processed by the control means. A microphone output signal produced by a microphone on the headset can be selectively provided to a plurality of output terminals and an attention signal can be selectively provided with the microphone output signal to selected output terminals. A distinctive audio pattern is produced in one of the earphones to help a person wearing the audio headset to distinguish between the reproduced voices of two different persons that are respectively reproduced during the same interval by the different earphones.

27 Claims, 2 Drawing Sheets

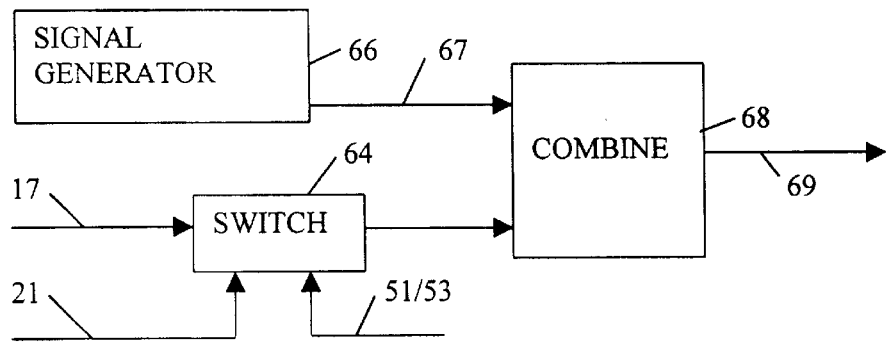
FIG. 2
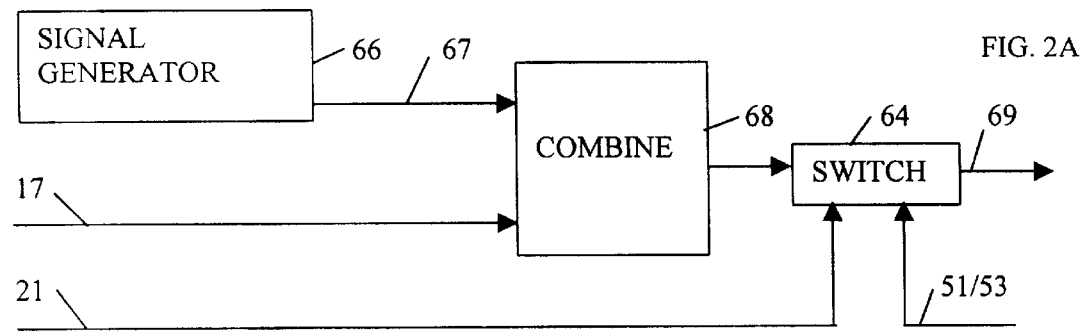
FIG. 2A
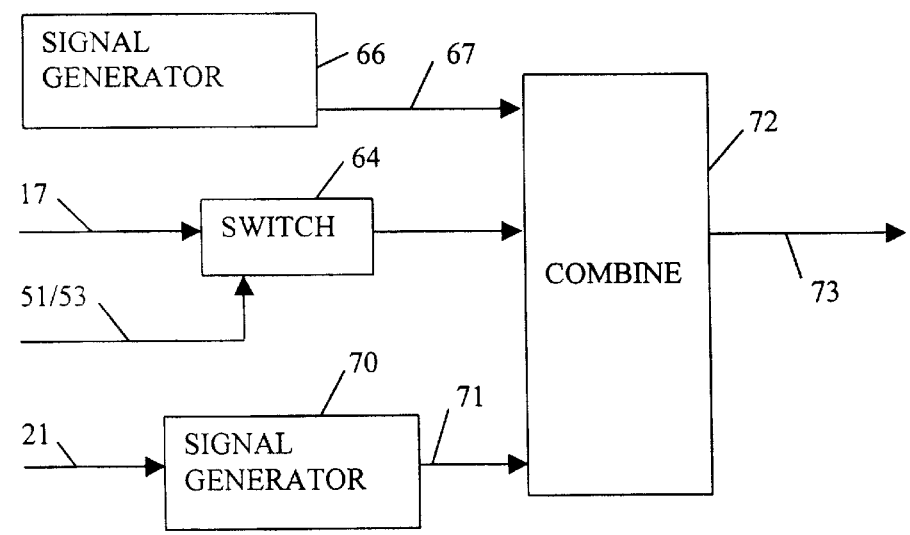
FIG. 3
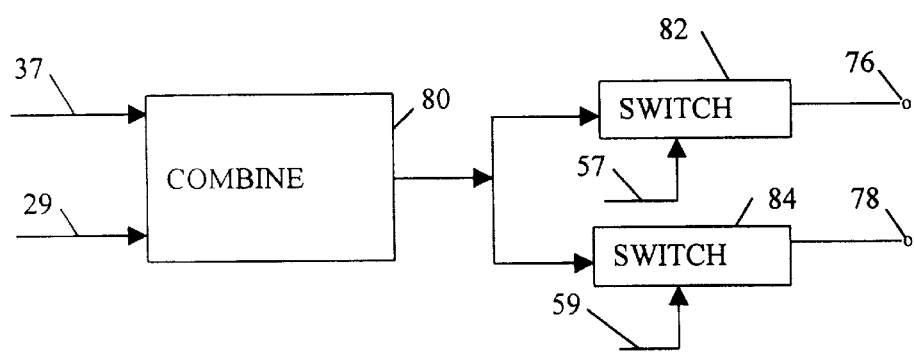

AUDIO HEADSET COMMUNICATION APPARATUS AND METHOD

BACKGROUND OF THE INVENTION

The present invention pertains to electronic communications and is particularly directed to audio communications systems utilizing an audio headset.

A typical audio headset includes a pair of earphones and may further include a microphone. In a monophonic headset, each earphone reproduces the same audio communication, such as a voice sound or music, in response to a received audio communication signal. In a stereophonic headset, a first earphone reproduces a first audio communication in response to a received first audio communication signal and a second earphone reproduces a second audio communication in response to a received second audio received audio communication signal, wherein the first and second communication signals are received from the same source as components of a stereo audio signal. A microphone detects sounds, such as voice sounds, and produces a microphone output signal in response to the detected sounds. The microphone output signal may be provided to a plurality of output terminals and thereby communicated simultaneously to audio speakers used by a plurality of persons.

SUMMARY OF THE INVENTION

According to the present invention, a person wearing a stereophonic audio headset, including a pair of earphones that are respectively connected for receiving voice communication signals from microphones used by two other persons, and a microphone that is coupled to speakers used by the two other persons, can communicate by voice simultaneously with both of the other persons.

Problems that occur that occur when so using a stereophonic headset to communicate simultaneously with two or more persons include difficulty in excluding one of the other persons from a conversation when privacy is desired; and difficulty in distinguishing between the reproduced voices of two different persons that are respectively reproduced simultaneously by the different earphones.

The present invention provides communication apparatus for enabling a person wearing a headset including first and second audio earphones to selectively communicate with two other persons, comprising an input circuit for connection to the first and second earphones for separately providing first and second audio communication signals separately received from different sources to the first and second earphones respectly, a and input switching means connected to the input circuit for selectively enabling the input circuit to provide either (a) the first audio communication signal to the first earphone, (b) the second audio communication signal to the second earphone, or (c) the first and second audio communication signals simultaneously and separately to the first and second earphones respectively.

The present invention also provides an audio communications headset, comprising first and second audio earphones; input circuit means connected to the first and second earphones for separately providing first and second audio communication signals separately received from different sources to the first and second earphones respectively; and input switching means connected to the input circuit means for selectively enabling the input circuit means to provide either (a) the first audio communication signal to the first earphone, (b) the second audio communication signal to the second earphone, or (c) the first and second audio communication signals simultaneously and separately to the first and second earphones respectively.

The present invention additionally provides communication apparatus for enabling a person wearing a headset including first and second audio earphones to communicate with two other persons, comprising an input circuit for connection to the first and second earphones for separately providing first and second audio communication signals separately received from different sources to the first and second earphones respectively; and means for generating a distinctive audio pattern signal; and means coupled to the input circuit for causing the generated distinctive audio pattern signal to be provided exclusively to the first earphone whenever the first audio communication signal is being provided to the first earphone.

The present invention still further provides a method of selectively communicating with two other persons by a person wearing a headset including first and second audio earphones, the method comprising the steps of:

(a) separately receiving a first audio communication signals from a first person and a second audio communication signal from a second person; and (b) selectively providing at different times (i) the first audio communication signal to the first earphone, (ii) the second audio communication signal to the second earphone, and (iii) the first and second audio communication signals simultaneously and separately to the first and second earphones respectively.

Additional features of the present invention are described with reference to the detailed description of the preferred embodiments.

BRIEF DESCRIPTION OF THE DRAWING

FIG. 2 is a schematic diagram of a preferred embodiment of a portion of the control circuit for the headset in the communication system shown in FIG. 1 that is adapted for selectively enabling an audio communication to be reproduced by an earphone in response to a received audio communication signal.

FIG. 2A is a schematic diagram of an alternative preferred embodiment of the portion of the control circuit shown in FIG. 2.

FIG. 3 is a schematic diagram of another alternative preferred embodiment of a portion of the control circuit for the headset in the communication system shown in FIG. 1 that is adapted for selectively enabling an audio communication to be reproduced by an earphone in response to a received audio communication signal.

FIG. 4 is a schematic diagram of a preferred embodiment of a portion of the control circuit for the headset in the communication system shown in FIG. 1 that is adapted for providing a microphone output signal and an attention signal to selected output terminals.

DETAILED DESCRIPTION

Figure 1:
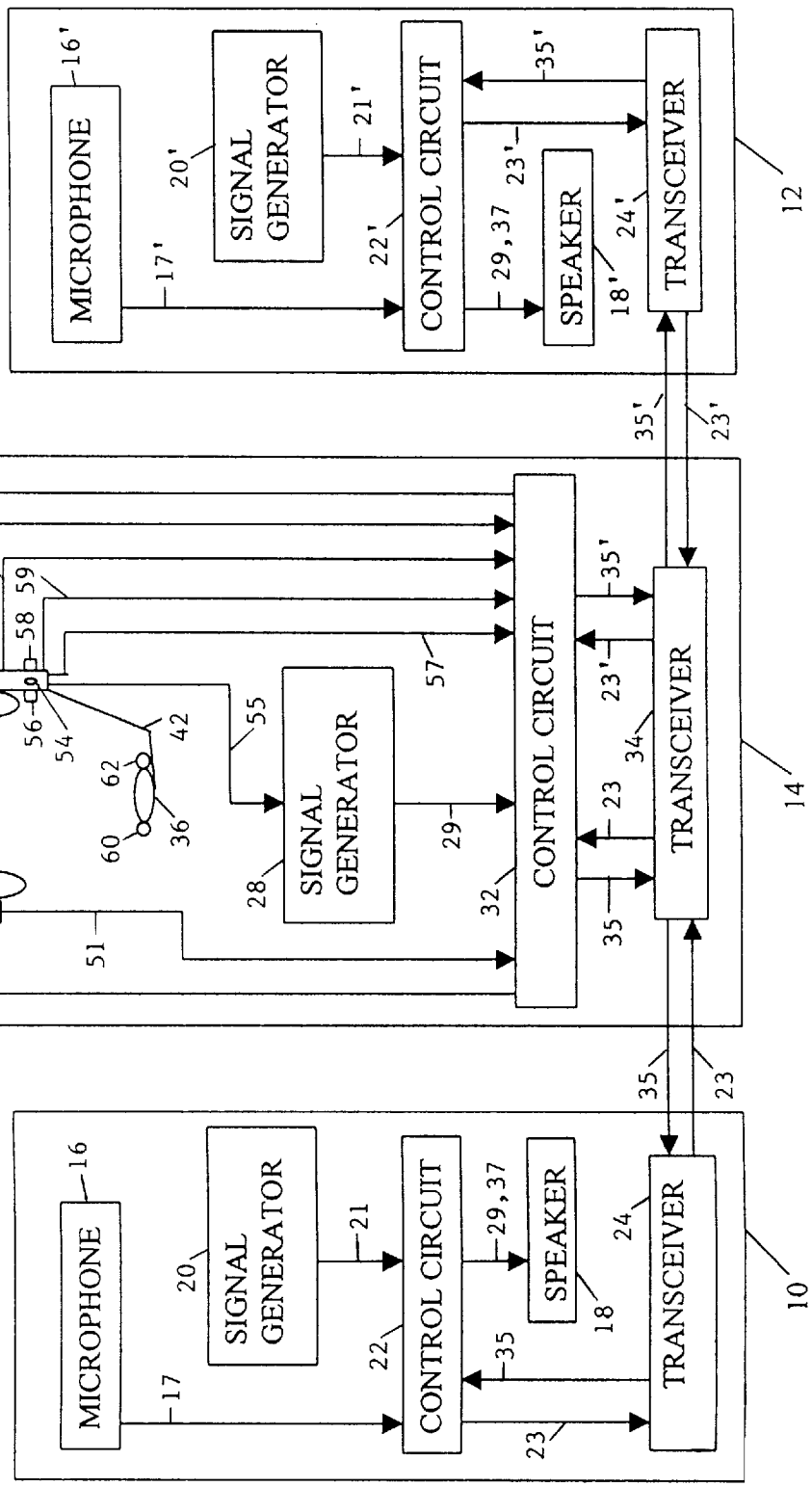
FIG. 1 is schematic diagram of a preferred embodiment of the audio communications system of the present invention.

Referring to FIG. 1, a preferred embodiment of an audio communications system according to the present invention includes a first set of communication apparatus 10, a second set of communication apparatus 12 and a third set of communication apparatus 14. The first set of communication apparatus 10 includes a microphone 16, a speaker 18, a signal generator 20, a control circuit 22, and a transceiver 24. The second set of communication apparatus 12 includes a microphone 16', a speaker 18', a signal generator 20', a control circuit 22', and a transceiver 24'. The third set of communication apparatus 14 includes a headset 26, a signal generator 28, a control circuit 32 and a transceiver 34.

The headset 26 includes a microphone 36, a first earphone 38 and a second earphone 40. The microphone 36 is attached to the second earphone 40 by an arm 42. A first control unit 44 is attached to the first earphone 38, a second control unit 46 is attached to the second earphone 40, and a third control unit 48 is attached to the arm 42 adjacent the second earphone 38. The first control unit 44 includes a first control button 50, the second control unit 46 includes a second control button 52, and the third control unit 48 includes a third control button 54, a fourth control button 56 and a fifth control button 58. A first display light 60, such as a light emitting diode, is attached to the arm 42 at one side of the microphone 36, and a second display light 62 is attached to the arm 42 at the other side of the microphone 36.

In the first set of communication apparatus 10, the microphone 16 produces a first voice communication signal 17, which is conditioned by the control circuit 22 to provide a first audio communication signal 23 that is transmitted by the transceiver 24 to the transceiver 34 for the headset 26 of the third set of communication apparatus 14. When it is desired to alert a person wearing the headset 26 that an audio communication signal 17 is being sent from the first set of communication apparatus 10, the signal generator 20 of the first set of communication apparatus 10 is actuated to generate a first attention signal 21, which is combined with the first voice communication signal 17 by the control circuit 22 while providing the first audio communication signal 23.

In the second set of communication apparatus 12, the microphone 16' produces a second voice communication signal 17', which is conditioned by the control circuit 22' to provide a second audio communication signal 23' that is transmitted by the transceiver 24' to the transceiver 34 for the headset 26 of the third set of communication apparatus 14. The headset transceiver 34 is coupled to the transceiver 24 of the first set of communication apparatus and the transceiver 24' of the second set of communication apparatus by radio links, wire and/or fiber optics. When it is desired to alert a person wearing the headset 26 that an audio communication signal 17' is being sent from the second set of communication apparatus 12, the signal generator 20' of the second set of communication apparatus 12 is actuated to generate a second attention signal 21', which is combined with the second voice communication signal 17' by the control circuit 22' while providing the second audio communication signal 23'.

The transceiver 34 for the headset 26 provides both the received first audio communication signal 23 and the received second audio communication signal 23' to the control circuit 32, which processes the received first audio communication signal 23 to derive a received first voice communication signal 17 and a received first attention signal 21, which is shown in FIGS. 2, 2A and 3, and processes the received second audio communication signal 23' to derive a received second voice communication signal 17' and a received second attention signal. The control circuit 32 also processes the received first voice communication signal 17 and the received second voice communication signal 17' in order to condition such signals for causing the first earphone 38 and the second earphones 40 to reproduce voice sounds in response thereto.

Referring to FIG. 2, a portion of the control circuit 32 that selectively enables the first voice communication to be reproduced by the first earphone 38 of the headset 26 in response to the received first voice communication signal 17 includes a switch 64, a signal generator 66, and a signal combining unit 68. The switch 64 is operated by a person wearing the headset 26 pressing the first control button 50 on the first control unit 44 attached to the first earphone 38. The first control button 50 contacts a circuit element (not shown) in the first earphone control unit 44 that is connected to the switch 64 by a wire 51 contained in a sleeve (not shown) extending between the first earphone control unit 44 and the control circuit 32. By operating the first control button 50, a person wearing the headset 26 can selectively enable the received first voice communication signal 17 to be provided to the first earphone 38. The signal generator 66 generates a distinctive audio pattern signal 67, to which the first earphone 38 responds by producing a distinctive audio pattern, such as a humming sound or a light melody that usually does not distract a person's attention from voice sounds. The signal combining unit 68 combines the distinctive audio pattern signal 67 with the received first voice communication signal 17 to provide a first composite audio communication signal 69 that is provided to the first earphone 38. The first earphone 38 responds to the first composite signal 69 by reproducing a first voice communication in response to the received first voice communication signal 17 and by producing the distinctive audio pattern in response to the distinctive audio pattern signal 67. The switch 64 responds whenever a first attention signal 21 is received by causing the received first audio communication signal 17 to be provided to the first earphone 38 notwithstanding whether or not the switch 64 had been set by operation of the control button 50 to enable the received first audio communication signal 17 to be provided to the first earphone 38.

The portion of the control circuit 32 that selectively enables the second voice communication to be reproduced by the second earphone 40 of the headset 26 in response to the received second voice communication signal 17' is the same as shown in FIG. 2, except that the signal generator 66 and the signal combining unit 68 are omitted so that a distinctive audio pattern is not produced by the second earphone 40. The switch 64 in this portion of the control circuit 32 is operated by a person wearing the headset 26 pressing the second control button 52 on the second control unit 46 attached to the second earphone 40. The second control button 52 contacts a circuit element (not shown) in the second earphone control unit 46 that is connected to the switch 64 by a wire 53 contained in a sleeve (not shown) extending between the second earphone control unit 46 and the control circuit 32. By operating the second control button 52, a person wearing the headset 26 can selectively enable the received second voice communication signal 17' to be provided to the second earphone 40. The second earphone 40 reproduces a second voice communication in response to the second voice communication signal 17'.

Although a distinctive audio pattern that differs from the distinctive audio pattern produced in the first earphone 38 could be produced in the second earphone 40, a distinctive audio pattern is produced in combination with a reproduced voice sound in only one of the two earphones 38, 40 in a preferred embodiment of the headset 26 that is designed for use by a person who prefers to associate the voice sounds reproduced in only one of the earphones 38, 40 with a distinctive audio pattern.

When it is desired that neither earphone 38, 40 produces a distinctive audio pattern in combination with the voice sound reproduced by the earphone 38, 40, two identical portions of the control circuit 32 as shown in FIG. 2, except for the omission of the signal generator 66 and the signal combining unit 68, are used respectively to selectively enable provision of the received first voice communication signal 17 to the first earphone 38 and to selectively enable provision of the received second voice communication signal 17' to the second earphone 40.

An alternative preferred embodiment of the portion of the control circuit 32 shown in FIG. 2 is shown in FIG. 2A. The alternative preferred embodiment of FIG. 2A differs from the embodiment of FIG. 2 only in that the switch 64 is located after rather than before the signal combining unit 68 so that the distinctive audio pattern signal 67 is provided to the first earphone 38 only when the switch 64 is operated to enable the first voice communication signal 17 to be provided to the first earphone 38. A portion of the control circuit 32 identical to that shown in FIG. 2A is used for selectively enabling provision of the second voice communication signal 17' to the second earphone 40 of the headset 26, except that different distinctive audio pattern signals 67 are generated by the signal generators 66 of the respective portions of control circuit 32 for provision to the first and second earphones 38, 40. Accordingly, a first distinctive audio pattern, such as a light melody, is produced in the first earphone 38 only when the received first audio communication signal 17 is provided to the first earphone 38 and a second distinctive audio pattern, such as a humming sound, is produced in the second earphone 40 only when the received second audio communication signal 17' is provided to the second earphone 40, so that a person wearing the headset 26 can readily determine to which of the first and second earphones 38, 40 provision of the respective first and second audio communications signals 17, 17' has been enabled, by listening for the first and distinctive audio patterns.

Referring to FIG. 3, an alternative embodiment of the portion of the control circuit 32 that selectively enables the first voice communication to be reproduced by the first earphone 38 of the headset 26 in response to the received first voice communication signal 17 includes a switch 64, a first signal generator 66, a second signal generator 70 and a signal combining unit 72. The switch 64 is operated by a person wearing the headset 26 pressing the first control button 50 on the first control unit 44 attached to the first earphone 38. The first control button 50 contacts a circuit element (not shown) in the first earphone control unit 44 that is connected to the switch 64 by a wire 51 contained in a sleeve (not shown) extending between the first earphone control unit 44 and the control circuit 32. By operating the first control button 50, a person wearing the headset 26 can selectively enable the received first voice communication signal 17 to be provided to the first earphone 38. The first signal generator 66 generates a distinctive pattern audio signal 67, to which the first earphone 38 responds by producing a distinctive audio pattern, such as a humming sound or a light melody that usually does not distract a person's attention form voice sounds. The second signal generator 70 responds to the received attention signal 21 by generating an attention audio signal 71 that causes the first earphone 38 to produce a distracting sound, such as a momentary buzz. The signal combining unit 72 combines the pattern audio signal 67 and the attention audio signal 71 (whenever such is generated) with the received first voice communication signal 17 to provide a first composite audio communication signal 73 that is provided to the first earphone 38. The first earphone 38 responds to the first composite signal 73 by reproducing a first voice communication in response to the received first voice communication signal 17, by producing the distinctive audio pattern in response to the distinctive audio pattern signal 67, and by producing the distracting sound in response to the attention audio signal 71. If, upon the distracting sound being produced by the first earphone 38, the switch 64 had not been set to enable the received first audio communication signal 17 to be provided to the first earphone 38, the person wearing the headset 26 can press the first control button 50 on the first control unit 44 attached to the first earphone 38 to enable the received first audio communication signal 17 to be provided to the first earphone 38.

In this alternative embodiment, the portion of the control circuit 32 that selectively enables the second voice communication to be reproduced by the second earphone 40 of the headset 26 in response to the received second voice communication signal 17' is the same as shown in FIG. 3, except that the signal generator 66 is omitted so that a distinctive audio pattern is not produced by the second earphone 40. The switch 64 in the portion of the control circuit 32 that selectively provides the received second voice communication signal 17' to the second earphone 40 is operated by a person wearing the headset 26 pressing the second control button 52 on the second control unit 46 attached to the second earphone 40. The second earphone 40 reproduces a second voice communication in response to the second voice communication signal 17' and produces the distracting sound in response to the attention audio signal 71.

In another alternative preferred embodiment, reproduction of first voice communication by the first earphone 38 in response to the received first voice communication signal 17 is enabled by enabling operation of the first earphone 38 by operating a switch (not shown) in the first control unit 44 by pressing the first control button 50 on the first control unit 44 attached to the first earphone 38; and reproduction of second voice communication by the second earphone 40 in response to the received second voice communication signal 17' is enabled by enabling operation of the second earphone 40 by operating a switch (not shown) in the second control unit 46 by pressing the second control button 52 on the second control unit 46 attached to the second earphone 40.

The control circuit 32 also provides the first attention signal 21 received from the first set of communication apparatus 10 to the first display light 60 and provides the second attention signal 21' received from the second set of communication apparatus 12 to the second display light 62. The first display light 60 responds to the first attention signal 21 by flashing on and off for a short duration to provide a visual indication of receipt by the headset 26 of an attention signal from the first set of communication apparatus 10; and the second display light 62 responds to the second attention signal 21' by flashing on and off for a short duration to provide a visual indication of receipt by the headset 26 of an attention signal from the second set of communication apparatus 12. The display light 60, 62 that responds to an attention signal 21, 21' from a given set of communication apparatus 10, 12 is on the same side of the headset 26 as the earphone 38, 40 that responds to an audio communication signal 17, 17' from the same given set of communication apparatus 10, 12 so that a person wearing the headset 26 can readily associate the visual indication with a given earphone 38, 40. In some embodiments, the display lights 60, 62 are mounted on a display panel in from the person wearing the headset 26 rather than adjacent the microphone 36 on the arm 42 of the headset 26.

The headset microphone 36 detects sounds and produces a microphone output signal 37 in response to the detected sounds. The signal generator 28 produces an attention signal 29 in response to being actuated by pressing the third control button 54 on the third control unit 48.

Referring to FIG. 4, a portion of the control circuit 32 that selectively enables the microphone output signal 37 from the headset 26 and the attention signal 29 from the signal generator 28 to be selectively provided to different output terminals for transmission to the first set of communication apparatus 10 and the second set of communication apparatus 12 includes a first output terminal 76, a second output terminal 78, a signal combining unit 80, a first switch 82 and a second switch 84. The signal combining unit 80 combines the microphone output signal 37 with the attention signal 29 that is produced by the signal generator 28 whenever the person wearing the headset 26 actuates the signal generator 28 by operating the third control button 54. The third control button 54 contacts a circuit element (not shown) in the third control unit 48 that is connected to the signal generator 28 by a wire 55. The output of the signal combining unit 80 is connected through the first switch 82 to the first output terminal 76 and is connected through the second switch 84 to the second output terminal 78.

The first switch 82 is operated by a person wearing the headset 26 pressing the fourth control button 56 on the third control unit 48. The fourth control button 56 contacts a circuit element (not shown) in the third control unit 48 that is connected to the first switch 82 by a wire 57 contained in the sleeve extending between the third control unit 48 and the control circuit 32. By operating the first switch 82, a person wearing the headset 26 can selectively cause the received microphone output signal 37 and any attention signal 29 produced by the signal generator 28 to be provided to the first output terminal 76 for transmission to the first set of communication apparatus 10. The second switch 84 is operated by a person wearing the headset 26 pressing the fifth control button 58 on the third control unit 48. The fifth control button 58 contacts a circuit element (not shown) in the third control unit 48 that is connected to the second switch 84 by a wire 59 contained in the sleeve extending between the third control unit 48 and the control circuit 32. By operating the second switch 84, a person wearing the headset 26 can selectively cause the received microphone output signal 37 and any attention signal 29 produced by the signal generator 28 to be provided to the second output terminal 78 for transmission to the second set of communication apparatus 12.

The headset control circuit 32 conditions the signal provided at the first output terminal 76 to provide an audio communication signal 35 that is transmitted by the headset transceiver 34 to the transceiver 24 of the first set of communication apparatus 10; and control circuit 32 conditions the signal provided at the second output terminal 78 to provide an audio communication signal 35' that is transmitted by the headset transceiver 34 to the transceiver 24' of the second set of communication apparatus 12.

In the first set of communication apparatus 10, the transceiver 24 provides the received audio communication signal 35 to the control circuit 22, which processes the received audio communication signal 35 to derive a received microphone output signal 37 and a received attention signal 29. The control circuit 22 also processes the received microphone output signal 37 and any received attention signal 29 in order to condition such signals for causing the speaker 18 to reproduce sounds in response thereto. The speaker 18 reproduces a voice communication in response to the received microphone output signal 37 and produces a distracting sound in response to any received attention signal 29.

In the second set of communication apparatus 12, the transceiver 24' provides the received audio communication signal 35' to the control circuit 22', which processes the received audio communication signal 35' to derive a received microphone output signal 37 and a received attention signal 29. The control circuit 22' also processes the received microphone output signal 37 and any received attention signal 29 in order to condition such signals for causing the speaker 18' to reproduce sounds in response thereto. The speaker 18' reproduces a voice communication in response to the received microphone output signal 37 and produces a distracting sound in response to any received attention signal 29.

The respective microphones 16, 16' and/or speakers 18, 18' of the first and second set of communication apparatus 10, 12 may be embodied in headsets, such as the headset 26 of the third set of communication apparatus 14, and/or they may be embodied in telephone handsets and/or in other combinations of detached microphones and speakers.

The communications system and headset 26 described herein are particularly well suited for military and police operations, and may be used by any person wearing a headset for conversing with two or more persons, such by a radio or television broadcast director, or by an athletic coach at one location while conversing with other coaches at other locations during an athletic contest, or by a stockbroker while conversing with clients at different remote locations, or by air traffic controllers while conversing with pilots and/or each other, or by a car driver while conversing with persons at different remote locations.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

I claim:

1. Communication apparatus for enabling a person wearing a headset including first and second audio earphones to selectively communicate with two other persons, comprising;

an input circuit for connection to the first and second earphones for separately providing first and second audio communication signals separately received from different sources to the first and second earphones respectively; and input switching means connected to the input circuit for selectively enabling the input circuit to provide either (a) the first audio communication signal to the first earphone, (b) the second audio communication signal to the second earphone, or (c) the first and second audio communication signals simultaneously and separately to the first and second earphones respectively.

2. Communication apparatus according to claim 1 for use with a said headset that also includes a microphone, the apparatus further comprising first and second output terminals;

an output circuit for connection to the microphone for providing a microphone output signal from the microphone to the first and second output terminals; and output switching means connected to the output circuit for selectively enabling the output circuit to provide the microphone output signal to either (i) the first output terminal, (ii) the second output terminal, or (iii) the first and second output terminals simultaneously.

3. Communication apparatus according to claim 2, further comprising means for generating an attention signal;

wherein the generating means is coupled to the output circuit for providing the generated attention signal to the first output terminal and/or the second output terminal to which the microphone output signal is selectively provided.

4. Communication apparatus according to claim 1, further comprising switching means coupled to the input circuit for responding to a received attention signal related to either of said received first audio communication signal or said received second audio communication signal by causing the input circuit to provide the related first or second communication signal to the respective first or second earphone.

5. Communication apparatus according to claim 1, further comprising means for generating an attention audio signal; and means coupled to the input circuit for responding to a received attention signal related to either of said received first audio communication signal or said received second audio communication signal by causing the generated attention audio signal to be provided to the respective first or second earphone.

6. Communication apparatus according to claim 1, further comprising display means for responding to a received attention signal related to either of said received first audio communication signal or said received second audio communication signal by providing a visual indication to the person wearing the headset that the respective first or second audio communication signal is being received.

7. Communication apparatus according to claim 1, further comprising means for generating a distinctive audio pattern signal; and means coupled to the input circuit for causing the generated distinctive audio pattern signal to be provided exclusively to the first earphone whenever the first audio communication signal is being provided to the first earphone.

8. Communication apparatus according to claim 7, further comprising means for generating a second distinctive audio pattern signal that differs from the distinctive audio pattern signal provided to the first earphone; and means coupled to the input circuit for causing the generated second distinctive audio pattern signal to be provided exclusively to the second earphone whenever the second audio communication signal is being provided to the second earphone.

9. An audio communications headset, comprising first and second audio earphones;

input circuit means connected to the first and second earphones for separately providing first and second audio communication signals separately received from different sources to the first and second earphones respectively; and input switching means connected to the input circuit means for selectively enabling the input circuit means to provide either (a) the first audio communication signal to the first earphone, (b) the second audio communication signal to the second earphone, or (c) the first and second audio communication signals simultaneously and separately to the first and second earphones respectively.

10. A headset according to claim 9 that also includes a microphone, the headset further comprising first and second output terminals;

an output circuit for connection to the microphone for providing a microphone output signal from the microphone to the first and second output terminals; and output switching means connected to the output circuit for selectively enabling the output circuit to provide the microphone output signal to either (i) the first output terminal, (ii) the second output terminal, or (iii) the first and second output terminals simultaneously.

11. A headset according to claim 10, in combination with means for generating an attention signal;

wherein the generating means is coupled to the output circuit for providing the generated attention signal to the first output terminal and/or the second output terminal to which the microphone output signal is selectively provided.

12. A headset according to claim 9, in combination with communication apparatus comprising switching means coupled to the input circuit for responding to a received attention signal related to either of said received first audio communication signal or said received second audio communication signal by causing the input circuit to provide the related first or second communication signal to the respective first or second earphone.

13. A headset according to claim 9, in combination with communication apparatus comprising means for generating an attention audio signal; and means coupled to the input circuit for responding to a received attention signal related to either of said received first audio communication signal or said received second audio communication signal by causing the generated attention audio signal to be provided to the respective first or second earphone.

14. A headset according to claim 9, further comprising display means for responding to a received attention signal related to either of said received first audio communication signal or said received second audio communication signal by providing a visual indication to the person wearing the headset that the respective first or second audio communication signal is being received.

15. A headset according to claim 9, in combination with communication apparatus comprising means for generating a distinctive audio pattern signal; and means coupled to the input circuit for causing the generated distinctive audio pattern signal to be provided exclusively to the first earphone whenever the first audio communication signal is being provided to the first earphone.

16. A headset according to claim 15, in combination with communication apparatus comprising means for generating a second distinctive audio pattern signal that differs from the distinctive audio pattern signal provided to the first earphone; and means coupled to the input circuit for causing the generated second distinctive audio pattern signal to be provided exclusively to the second earphone whenever the second audio communication signal is being provided to the second earphone.

17. Communication apparatus for enabling a person wearing a headset including a microphone to selectively communicate with two other persons, comprising first and second output terminals;

an output circuit for connection to the microphone for providing a microphone output signal from the microphone to the first and second output terminals;

output switching means connected to the output circuit for selectively enabling the output circuit to provide the microphone output signal to either (i) the first output terminal, (ii) the second output terminal, or (iii) the first and second output terminals simultaneously;

means on the headset for controlling operation of the output switching means; and means for generating an attention signal;

wherein the generating means is coupled to the output circuit for providing the generated attention signal to the first output terminal and/or the second output terminal to which the microphone output signal is selectively provided.

18. Communication apparatus for enabling a person wearing a headset including first and second audio earphones to communicate with two other persons, comprising an input circuit for connection to the first and second earphones for separately providing first and second audio communication signals separately received from different sources to the first and second earphones respectively; and means for generating a distinctive audio pattern signal; and means coupled to the input circuit for causing the generated distinctive audio pattern signal to be provided exclusively to the first earphone whenever the first audio communication signal is being provided to the first earphone.

19. Communication apparatus according to claim 18, further comprising means for generating a second distinctive audio pattern signal that differs from the distinctive audio pattern signal provided to the first earphone; and means coupled to the input circuit for causing the generated second distinctive audio pattern signal to be provided exclusively to the second earphone whenever the second audio communication signal is being provided to the second earphone.

20. A method of selectively communicating with two other persons by a person wearing a headset including first and second audio earphones, the method comprising the steps of:

(a) separately receiving a first audio communication signals from a first person and a second audio communication signal from a second person; and (b) selectively providing at different times (i) the first audio communication signal to the first earphone, (ii) the second audio communication signal to the second earphone, and (iii) the first and second audio communication signals simultaneously and separately to the first and second earphones respectively.

21. A method according to claim 20 for use with a said headset that also includes a microphone, the method further comprising the steps of:

(c) selectively providing at different times a microphone output signal from the microphone for transmission to (iv) the first person, (v) the second person, and (vi) the first and second persons simultaneously.

22. A method according to claim 21, further comprising the steps of:

(c) generating an attention signal; and (d) providing the generated attention signal to the first output terminal and/or the second output terminal to which the microphone output signal is selectively provided.

23. A method according to claim 20, further comprising the step of:

(c) responding to a received attention signal related to either of said received first audio communication signal or said received second audio communication signal by providing the related first or second communication signal to the respective first or second earphone.

24. A method according to claim 20, further comprising the steps of:

(c) responding to a received attention signal related to either of said received first audio communication signal or said received second audio communication signal by generating an attention audio signal; and (d) causing the generated attention audio signal to be provided to the respective first or second earphone.

25. A method according to claim 20, further comprising the step of:

(c) responding to a received attention signal related to either of said received first audio communication signal or said received second audio communication signal by providing a visual indication to the person wearing the headset that the respective first or second audio communication signal is being received.

26. A method according to claim 20, further comprising the steps of:

(c) generating a distinctive audio pattern signal; and (d) providing the generated distinctive audio pattern signal exclusively to the first earphone whenever the first audio communication signal is being provided to the first earphone.

27. A method according to claim 20, further comprising the steps of:

(e) generating a second distinctive audio pattern signal that differs from the distinctive audio pattern signal provided to the first earphone; and (f) providing the generated second distinctive audio pattern signal exclusively to the second earphone whenever the second audio communication signal is being provided to the second earphone.

* * * * *